US009921038B2

(12) United States Patent
Weinhold

(10) Patent No.: US 9,921,038 B2
(45) Date of Patent: Mar. 20, 2018

(54) GLASS-BONDED METAL POWDER CHARGE LINERS

(71) Applicant: Schott Corporation, Elmsford, NY (US)

(72) Inventor: Carsten Weinhold, Scranton, PA (US)

(73) Assignee: SCHOTT CORPORATION, Elmsford, NY (US)

( * ) Notice: Subject to any disclaimer, the term of this patent is extended or adjusted under 35 U.S.C. 154(b) by 0 days.

(21) Appl. No.: 14/214,143

(22) Filed: Mar. 14, 2014

(65) Prior Publication Data

US 2014/0314977 A1 Oct. 23, 2014

Related U.S. Application Data

(60) Provisional application No. 61/792,400, filed on Mar. 15, 2013.

(51) Int. Cl.

| B22F 7/00 | (2006.01) |
|---|---|
| F42B 1/032 | (2006.01) |
| F42B 1/028 | (2006.01) |
| F42B 1/036 | (2006.01) |
| B22F 3/22 | (2006.01) |
| C22C 1/10 | (2006.01) |
| C22C 32/00 | (2006.01) |

(52) U.S. Cl.
CPC ............... *F42B 1/032* (2013.01); *B22F 3/22* (2013.01); *C22C 1/1084* (2013.01); *C22C 32/0089* (2013.01); *F42B 1/028* (2013.01); *F42B 1/036* (2013.01); *B22F 2998/10* (2013.01); *Y02P 10/295* (2015.11); *Y10T 428/1314* (2015.01); *Y10T 428/24479* (2015.01)

(58) Field of Classification Search
None
See application file for complete search history.

(56) References Cited

U.S. PATENT DOCUMENTS 2,605,703 A * 8/1952 Lawson .................. F42B 1/032
102/306
3,019,103 A * 1/1962 Alexander et al. ............. 419/19
(Continued)

FOREIGN PATENT DOCUMENTS

| CN | 1524649 | 9/2004 |
|---|---|---|
| CN | 101007351 | 8/2007 |

(Continued)

OTHER PUBLICATIONS

McColm, I.J., Dictionary of Ceramic Science and Engineering, 1994, Springer Science+Business Media, 2$^{nd}$ Ed., p. 26.*
(Continued)

*Primary Examiner* — Seth Dumbris
(74) *Attorney, Agent, or Firm* — Ohlandt, Greeley, Ruggiero & Perle, L.L.P.

(57) ABSTRACT

The shaped composites of the present disclosure have metal powder bonded with glass powder. This feature provides the advantages of metal, metal powder, or glass composite materials, without suffering from the disadvantages. The composite is prepared with simple sintering methods, and can easily be formed into any number of desired shapes with dimensional characteristics and ingredients suited to a particular application.

30 Claims, 9 Drawing Sheets

(56) References Cited

U.S. PATENT DOCUMENTS

| | | | |
|---|---|---|---|
| 3,165,821 A | | 1/1965 | Breton |
| 3,332,751 A | * | 7/1967 | Breton .......................... 75/234 |
| 4,383,944 A | * | 5/1983 | Ondracek ...................... 588/11 |
| 4,458,485 A | | 7/1984 | Seelmann |
| 4,505,988 A | * | 3/1985 | Urano ................. C22C 33/0207 251/359 |
| 4,715,892 A | * | 12/1987 | Mahulikar ................. C22C 1/05 257/E23.009 |
| 4,748,136 A | * | 5/1988 | Mahulikar et al. ............. 501/32 |
| 4,756,754 A | * | 7/1988 | SinghDeo ............... C22C 29/00 75/233 |
| 4,960,629 A | | 10/1990 | Jarmon et al. |
| 5,497,620 A | * | 3/1996 | Stobbe ........................... 60/303 |
| 5,785,879 A | | 7/1998 | Kawamura et al. |
| 6,362,119 B1 | * | 3/2002 | Chiba ................... C03C 14/004 501/15 |
| 6,502,554 B1 | * | 1/2003 | Buehler ................. F02M 61/18 123/467 |
| 6,554,081 B1 | * | 4/2003 | Brooks ................. E21B 43/117 102/310 |
| 6,793,705 B2 | * | 9/2004 | Kosco ...................... C22C 1/05 419/10 |
| 6,833,018 B1 | * | 12/2004 | Kosco ................. C22C 32/0089 419/10 |
| 6,962,634 B2 | | 11/2005 | Nielson et al. |
| 8,220,394 B2 | | 7/2012 | Bates et al. |
| 2004/0043051 A1 | | 3/2004 | Pilliar et al. |
| 2004/0182201 A1 | | 9/2004 | Fuwa et al. |
| 2007/0056462 A1 | | 3/2007 | Bates et al. |
| 2008/0248707 A1 | * | 10/2008 | Liebald et al. ............... 442/181 |
| 2010/0279007 A1 | * | 11/2010 | Briselden et al. ............ 427/243 |
| 2011/0159760 A1 | | 6/2011 | Liebald et al. |
| 2011/0162550 A1 | * | 7/2011 | Hash ........................ C22C 1/04 102/506 |
| 2013/0126238 A1 | | 5/2013 | Church et al. |

FOREIGN PATENT DOCUMENTS

| | | | |
|---|---|---|---|
| CN | 101745640 | | 6/2010 |
| CN | 102896311 | | 1/2013 |
| EP | 0396806 A1 | | 11/1990 |
| EP | 0718249 A | | 6/1996 |
| GB | 1354363 A | | 5/1974 |
| JP | 2005085564 | * | 3/2005 ............... H05B 3/14 |
| WO | 2005035939 A1 | | 4/2005 |
| WO | 2012013926 A1 | | 2/2012 |

OTHER PUBLICATIONS

Abubakir et al., "Study on the corrosion and mechanical properties of FJ316 stainless steel-glass composite", Jun. 1998, Acta Metallurgica Sinica, vol. 11, pp. 175-182.*

AK Steel, "Product Data Sheet 316/316L stainless steel", Jul. 2007, AK Steel Corporation, pp. 1-2.*

University of Delaware, "Physical Properties", Nov. 2011, http://web.archive.org/web/20111109123252/http://www.udel.edu/chem/GlassShop/PhysicalProperties.htm.*

Haynes, W.M., "CRC Handbook of Chemistry and Physics", 2016, CRC, 96$^{th}$ Ed. pp. 4-43, 4-44, 4-61, 4-75, 4-77.*

Morsi, K; "Review: Reaction Synthesis Processing of Ni-Al Intermetallic Materials"; Materials Science & Engineering; Aug. 8, 2000; pp. 1-15.

Held, Manfred; "Liners for Shaped Charges"; Journal of Battlefield Technology, vol. 4, No. 3; Nov. 2001; pp. 1-7.

Wei, Chung-Ting; "Literature Review: Rapid Exothermic Reactions in Materials"; University of California; pp. 1-36.

Martin, Morgana; "Processing and Characterization of Energetic and Structural Behavior of Nickel Aluminum With Polymer Binders"; Georgia Institute of Technology; Apr. 2005; pp. 1-197.

Langan, Timothy; "Reactive Shaped Charge Liner"; Surface Treatment Technologies, Inc.; pp. 1-4.

International Search Report dated Dec. 1, 2014 for PCT application No. PCT/US2014/029581.

Written Opinion dated Dec. 1, 2014 for PCT application No. PCT/US2014/029581.

Austin, Ryan A.; "Numerical Simulation of the Shock Compression of Microscale Reactive Particle Systems"; Georgia Institue of Technology; Aug. 2005; pp. 1-208.

Austin, Ryan A.; "Modeling Shock Wave Propagation in Discrete Ni/Al Power Mixtures"; Georgia Institue of Technology; Dec. 2010; pp. 1-204.

Baker et al; "Glass as a Shaped Charge Liner Material"; 26th International Symposium on Ballistics; Sep. 12-16, 2011; pp. 1-8.

Baker et al; "Glass as Shaped Charge Liner Material"; RDECOM; Sep. 14, 2011; pp. 1-18.

Church et al; "Investigation of a Nickel-Aluminum Reactive Shaped Charge Liner"; Journal of Applied Mechanics; May 2013; pp. 1-13.

Du et al; "Impact Initiation of Pressed Al-Based Intermetallic-Forming Powder Mixture Compacts"; American Institue of Physics 2009; pp. 1-5.

Edwards et al; "Preliminary Results From Firings of Glass Shaped Charge Jets Into Steel Targets"; Department of Applied Science, Security and Resilience, Cranfield University; pp. 1-8.

Fischer et al; "A Survey of Combustable Metals, Thermites, and Intermetallics for Pyrotechnic Applications"; Sandia National Laboratories; 32nd AIAA/ASME/SAE/ASEE Joint Propulsion Conference; Jul. 1-3, 1996; pp. 1-15.

Glenn ,L.A; "Pressue Enhanced Pentration With Shaped Charge Perforators"; Eastern Regional Meeting of the Society of Petroleum Engineers; Nov. 9-13, 1998; pp. 1-13.

Martin, Morgana; "Processing and Characterization of Energetic and Structural Behavior of Nickel Aluminum With Polymer Binder"; Georgia Institute of Technology; Apr. 2005; pp. 1-197.

Narayanan, Vindhya; "Non-Equilibrium Thermomechanics of Multifunctional Energetic Structural Materials"; Georgia Institute of Technology; Dec. 2005; pp. 1-252.

Reding, Derek J.; "Shock Induced Chemical Reactions in Energetic Structural Materials"; Georgia Institute of Technology; Dec. 4, 2008; pp. 1-294.

Specht, Paul Elliot; "Shock Compression Response of Aluminum-Based Intermetallic-Forming Reactive Systems"; Georgia Institute of Technology; May 2013; pp. 1-365.

Tucker, Michael D.; "Characterization of Impact Initiation of Aluminum-Based Intermetallic-Forming Reactive Materials"; Georgia Institute of Technology; Dec. 2011; pp. 1-84.

Vigil, Manuel G.; Conical Shaped Charge Pressed Powder, Metal Liner Jet Characterization and Penetration in Aluminum; Sandia National Laboratories; May 1997; pp. 1-123.

Walters et al; "Investigation of a Bulk Metallic Glass as a Shaped Charge Liner Material"; Army Research Laboratory; Aug. 2006; pp. 1-46.

Walters, Williams; "A Brief History of Shaped Charges"; Army Research Laboratory; Dec. 2008; 1-16.

Wei, Chung-Ting; "Literature Review: Rapid Exothermic Reactions in Materials"; Materials Science & Engineering, University of California; 1995; 1-36.

International Preliminary Report on Patentability (IPRP) dated Apr. 10, 2014 for PCT application No. PCT/US2014/029581.

\* cited by examiner

| Glass Constituent | | dH | Log(K) | [Mol Al]/[Mol] | dH | Log(K) | [Mol Mg]/[Mol] | dH | Log(K) | [Mol Ca]/[Mol] | dH | Log(K) | [Mol Ti]/[Mol] |
|---|---|---|---|---|---|---|---|---|---|---|---|---|---|
| Oxide | [g/mol] | [kJ/Mol] | [] | | [kJ/Mol] | [] | | [kJ/Mol] | [] | | [kJ/Mol] | [] | |
| Al₂O₃ | 101.961 | | | | -129.64 | 24.11 | 3.00 | -229.55 | 43.56 | 3.00 | 258.18 | -47.62 | 1.50 |
| As₂O₃ | 197.841 | -1020.43 | 192.56 | 1.00 | -1149.726 | 216.673 | 3.00 | -1249.98 | 236.121 | 3.00 | -762.25 | 144.49 | 1.50 |
| B₂O₃ | 69.618 | -401.77 | 74.40 | 1.00 | -531.06 | 98.51 | 3.00 | -631.31 | 117.96 | 3.00 | -143.59 | 26.78 | 1.50 |
| BaO | 153.329 | -4.56 | 0.41 | 0.67 | -47.66 | 8.45 | 1.00 | -81.08 | 14.93 | 1.00 | 81.50 | -15.46 | 0.50 |
| Bi₂O₃ | 465.959 | -1089.70 | 208.40 | 1.00 | -1230.09 | 232.51 | 3.00 | -1330.34 | 251.96 | 3.00 | -842.61 | 160.78 | 1.50 |
| CaO | 56.079 | 76.52 | -14.52 | 0.67 | 33.42 | -6.48 | 1.00 | | | 1.00 | 162.58 | -30.39 | 0.50 |
| CeO₂ | 172.119 | -26.34 | 5.42 | 1.33 | -112.53 | 21.49 | 2.00 | -179.37 | 34.46 | 2.00 | 145.78 | -26.33 | 1.00 |
| Cs₂O | 281.81 | -415.11 | 233.60 | 0.67 | -916.42 | 171.81 | 1.00 | -288.58 | 56.23 | 1.00 | -126.00 | 25.83 | 0.50 |
| Gd₂O₃ | 362.498 | 163.81 | -32.46 | 1.00 | 34.52 | -8.35 | 3.00 | -65.74 | 11.10 | 3.00 | 421.99 | -80.08 | 1.50 |
| K₂O | 94.196 | -190.71 | 117.32 | 0.67 | -238.37 | 47.14 | 1.00 | -271.79 | 53.63 | 1.00 | -109.21 | 23.23 | 0.50 |
| La₂O₃ | 325.809 | 119.17 | -23.67 | 1.00 | -10.13 | 0.44 | 3.00 | -110.38 | 19.89 | 3.00 | 377.35 | -71.29 | 1.50 |
| Li₂O | 29.881 | 39.17 | -19.61 | 0.67 | -3.93 | 1.50 | 1.00 | -37.20 | 7.98 | 1.00 | 125.23 | -22.41 | 0.50 |
| MoO₃ | 143.938 | -930.52 | 175.21 | 2.00 | -1059.81 | 193.32 | 3.00 | -1160.06 | 216.76 | 3.00 | -672.33 | 127.58 | 1.00 |
| Na₂O | 61.979 | -143.42 | 86.34 | 0.67 | -186.51 | 36.82 | 1.00 | -219.93 | 43.30 | 1.00 | -57.36 | 12.91 | 0.50 |
| Nb₂O₅ | 265.81 | -892.96 | 167.07 | 3.33 | -1107.89 | 207.14 | 5.00 | -1274.98 | 239.56 | 5.00 | -462.10 | 87.59 | 2.50 |
| P₂O₅ | 141.945 | -1288.01 | 244.16 | 3.33 | -1502.94 | 284.24 | 5.00 | -1670.03 | 308.00 | 5.00 | -857.15 | 164.68 | 2.50 |
| PbO | 223.199 | -340.26 | 194.45 | 0.67 | -383.36 | 72.85 | 1.00 | -416.77 | 79.34 | 1.00 | -254.20 | 48.94 | 0.50 |
| SiO₂ | 291.498 | -956.51 | 182.64 | 1.00 | -1095.80 | 206.75 | 3.00 | -1196.05 | 226.19 | 3.00 | -702.33 | 135.01 | 1.50 |
| SnO₂ | 60.084 | -206.13 | 57.10 | 1.33 | -292.33 | 54.14 | 2.00 | -359.17 | 67.20 | 2.00 | -34.01 | 6.32 | 1.00 |
| SrO | 103.619 | 33.66 | -20.00 | 0.67 | -9.44 | 1.37 | 1.00 | -42.86 | 7.85 | 1.00 | -155.29 | 29.29 | 0.50 |
| Ta₂O₅ | 441.893 | -754.43 | 140.65 | 3.33 | -969.36 | 180.73 | 5.00 | -1136.45 | 213.14 | 5.00 | -323.57 | 61.18 | 2.50 |
| TeO₂ | 159.599 | -795.73 | 226.44 | 1.33 | -881.92 | 167.04 | 2.00 | -948.76 | 180.00 | 2.00 | -623.61 | 119.22 | 1.00 |
| TiO₂ | 79.899 | -172.12 | 47.62 | 1.33 | -258.32 | 47.82 | 2.00 | -325.15 | 60.78 | 2.00 | | | |
| V₂O₅ | 181.88 | -1241.63 | 233.31 | 3.33 | -1456.53 | 273.39 | 5.00 | -1623.65 | 305.80 | 5.00 | -623.61 | 119.22 | 2.50 |
| WO₃ | 231.848 | -832.29 | 156.71 | 2.00 | -961.59 | 180.82 | 4.00 | -1061.84 | 200.27 | 4.00 | -574.11 | 109.09 | 1.50 |
| ZnO | 81.379 | -210.16 | 120.12 | 0.67 | -253.25 | 48.08 | 1.00 | -286.67 | 54.56 | 1.00 | -124.10 | 26.16 | 0.50 |
| ZrO₂ | 123.219 | -16.56 | 3.65 | 1.33 | -102.76 | 18.51 | 2.00 | -169.60 | 31.47 | 2.00 | 155.56 | -29.31 | 1.00 |

Fig. 2

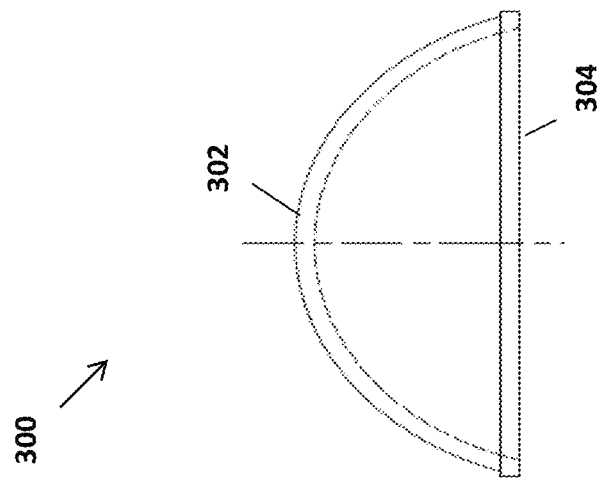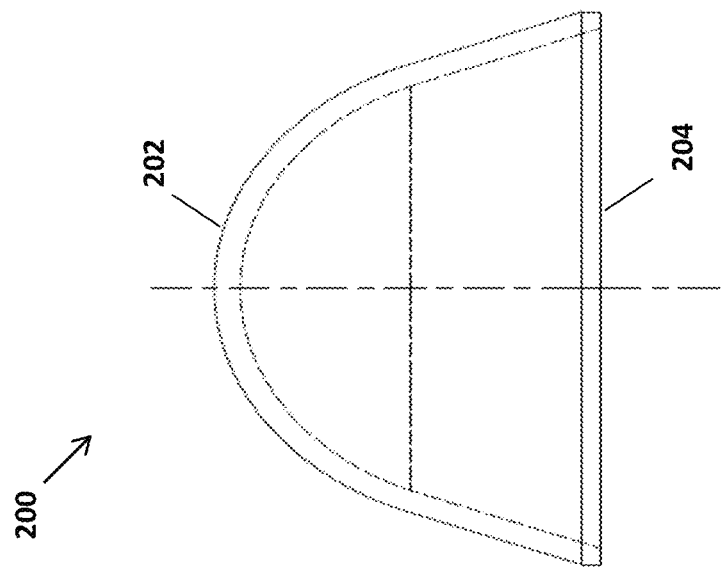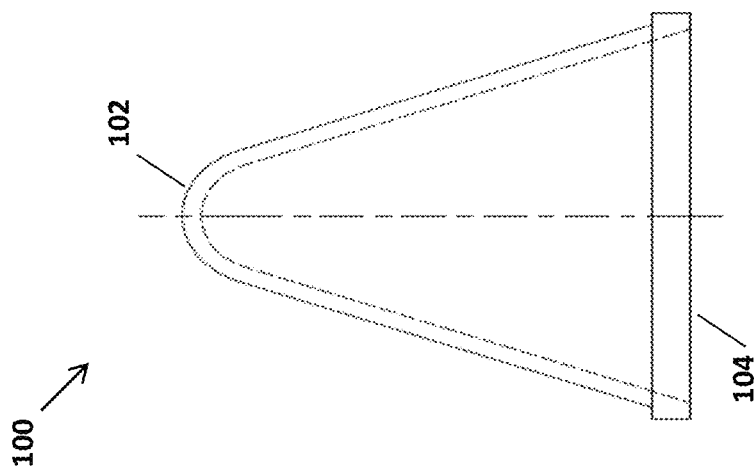

GLASS-BONDED METAL POWDER CHARGE LINERS

CROSS-REFERENCE TO RELATED APPLICATIONS

The present application claims priority to U.S. Provisional Patent Application No. 61/792,400, filed on Mar. 15, 2013, which is herein incorporated by reference.

BACKGROUND OF THE DISCLOSURE

1. Field of the Disclosure

The present disclosure relates to glass-metal composites. More particularly, the present disclosure relates to bonding of metal powders and metal powder mixtures with a suitable glass to obtain a mechanically strong, homogenous compact having controlled porosity without changing the properties of said metal powders.

2. Description of the Related Art

Metal powders or metal powder mixtures having widely varying particle size distributions, densities and coefficients of thermal expansion can be bonded so that a mixed state is achieved and preserved in a finished part without negatively affecting the functionality of the metal powders. Advantages to using metal powders or metal powder mixtures for energy release include high energy density, impact insensitivity, high temperature stability, high combustion temperature and a wide range of gas production. However, metal powders can also be very difficult to work with for these applications. It can be very difficult to ensure blend uniformity, especially after the mixture is molded to the desired shape. The metal powders can deform and lose their shape and spatial arrangement as they are compressed into one another. The die tools used to form the shape can be worn down and harmed by the metal powder mixture. The mixtures may also be subject to corrosion caused by air or humidity.

Due to their favorable jet forming characteristics certain glasses including borosilicate-, sodalime- and lead-glasses have also been contemplated as a shaped charge liner. Glass liners are currently used for demolition and trenching charges, and have also been used in the past to perforate well casings. However, their usefulness against hard target materials is limited by their comparatively low density (2.2-5.5 g per cubic centimeter) which leads to a reduction in penetration performance.

Currently available shaped composites suffer from one or more disadvantages. Those made entirely of stamped or sheet metal such as oxygen-free high thermal conductivity copper can be very easy to fabricate, provide flexibility in design, and upon detonation provide a jet with excellent coherence and penetration performance of the target. However, solid metal liners are known to create a "slug" or "carrot" that follows the tip of the jet. This is problematic in some applications, such as boreholes, because the slug will clog and prevent access to the hole. Compressed metal powder liners can address this concern, but require high pressures for consolidation, tend to be non-homogenous with regards to material density and compound distribution, and have a low mechanical strength, leading to uneven performance. Due to their low mechanical strength compressed metal powder composites also can change their shape over time are easily damaged which can lead to performance problems and extra equipment needed for handling and installation. Lastly, pure glass in the desired wall thickness range is difficult to fabricate and cannot be provided in densities high enough to be a viable material option where depth of penetration into a target is the key factor.

Accordingly, there is a need for a composite material that overcomes these disadvantages.

SUMMARY OF THE DISCLOSURE

The composite materials of the present disclosure are made of glass-bonded metal powders and metal powder mixtures. The present disclosure provides a method to bond metal powders or intimately mixed metal powder mixtures so that the spatial arrangement of the powders is preserved while protecting the powders from degradation, preserving their morphology, and preserving or enhancing their properties. The composite materials can be shaped as desired into thin-walled parts, and are of particular interest as armor components, structural energetic materials and shaped charge liners.

In one aspect of the present disclosure, the glass is selected so that the majority of its constituents are reduced to their elemental form by one or more of the metal constituents in an exothermic reaction, and the resultant products react exothermically with the remaining constituents of the composite or with materials in contact with the composite.

BRIEF DESCRIPTION OF THE DRAWINGS

FIG. 2 is a chart showing data relating to reactions involving oxide materials found in the glass phase of the composites of the present disclosure.

FIGS. 3a-3c show possible shapes for the composites of the present disclosure.

DETAILED DESCRIPTION OF THE DISCLOSURE

Figure 1:
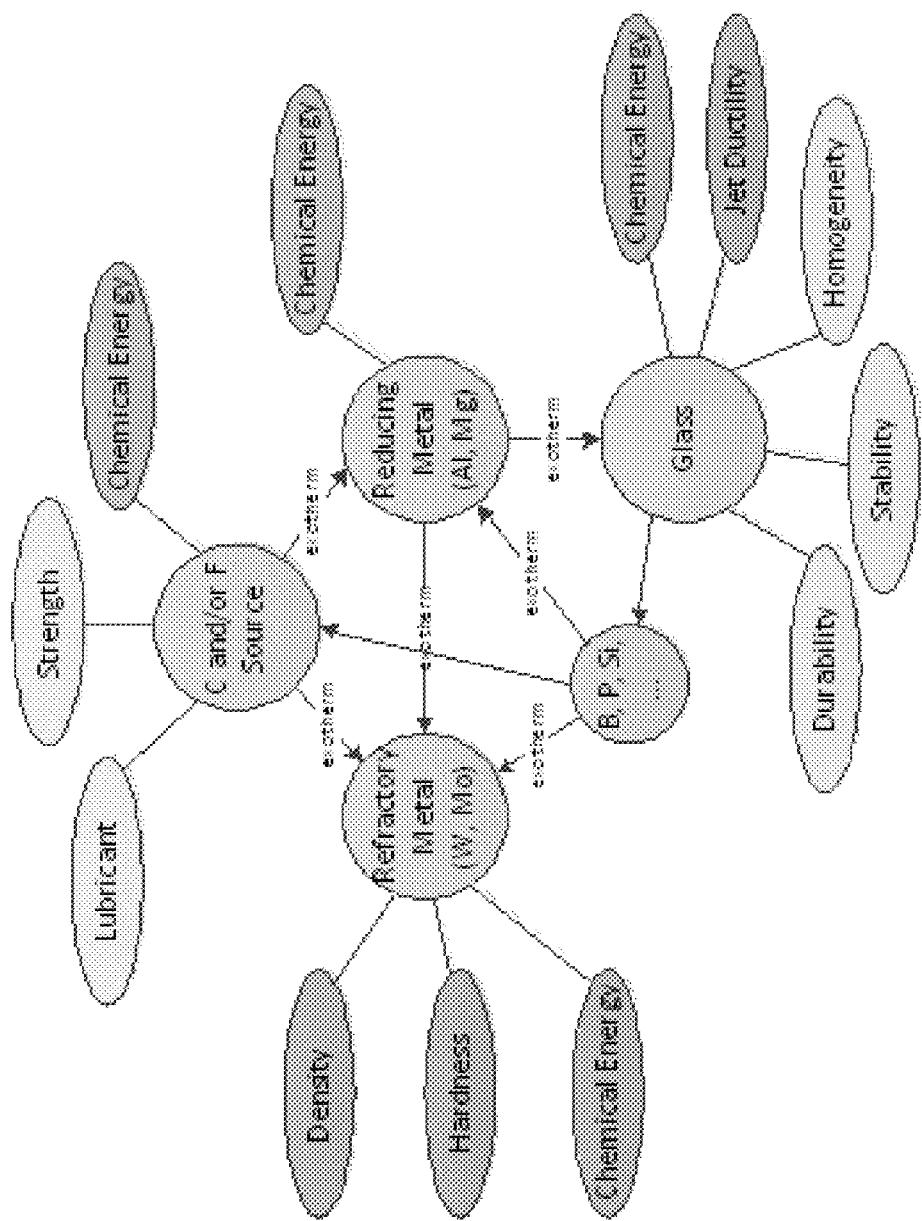
FIG. 1 is a schematic drawing showing the reaction pathways between the various components of the composites of the present disclosure.

The present disclosure provides a shaped composite material having metal powder bonded together with glass powder. The metal powder can be one single type of metal, of a preferably high density and hardness. The metal powder can also be a mixture of two or more types of metals, including metals that can react exothermally with other metals or metal-oxides in an intermetallic (metal-metal) or thermite (metal-metal oxide) reaction. As discussed in greater detail below, certain metal-metal or metal-metal oxide mixtures can provide especially favorable reaction characteristics, which can prove useful when the composite of the present disclosure is used in explosive or pyrotechnic applications. The present composites also provide high collapse strength, meaning that it is rigid enough to be handled, installed, and modified easily.

As stated above, currently available shaped composites suffer from one or more disadvantages. Solid metal liners are known to create a "slug" or "carrot" that follows the tip of the jet, and the slug will clog and prevent access to the hole. Compressed metal powder liners require high pressures for consolidation, tend to be non-homogenous with regards to material density and compound distribution, and have a low mechanical strength, leading to uneven performance. Due to their low mechanical strength compressed metal powder composites also can change their shape over time are easily damaged which can lead to performance problems and extra equipment needed for handling and installation. Lastly, pure glass in the desired wall thickness range is difficult to fabricate and cannot be provided in densities high enough to be a viable material option where depth of penetration into a target is the key factor.

By contrast, the shaped composites of the present disclosure combine the advantages of metal sheet, metal powder, and glass liners, while significantly alleviating the problems with the liners discussed above. The present composites are durable, yet easy to work with. They can be adjusted on-site for fine tuning, meaning that the can be easily cut, trimmed, or filed, if need be, without compromising the structural integrity of the entire liner. These attributes would not be possible with metal, metal powder, or glass liners, as they would either fracture or break if modification were attempted. The shaped composites of the present disclosure also exhibit a high collapse strength, yet do not form detrimental slugs that follow the tip of the jet. In this way, the present composites combine the dynamic properties of certain glasses (e.g., brittle at ambient conditions, ductile during jet formation) with the properties of heavy-metal powders (e.g., high density, high impact strength, high hardness, high melting point).

The metal powders used in the shaped composites of the present disclosure should have acceptable density and mechanical properties to produce a favorable jet. Suitable metals include relatively heavy metals, refractory metals, lanthanides, or actinides, or any mixtures of metals from those groups. Specific metals from this group include, but are not limited to, molybdenum, tantalum, uranium, tungsten, or any combinations thereof. Heavier metals are of particular interest because of their density, which enhances target penetration if a coherent jet can be produced. As discussed in greater detail below, the metal powders are milled, classified and mixed to an appropriate particle size distribution.

The glass powder used in the present application can be selected any one of the following: borosilicate, alumino-silicate, lead-silicate, soda-lime-silicate, lanthanum-crown, alumino-phosphate, lead-borate, boro-phosphate, zinc-borate, zinc-phosphate, or any combinations thereof. Examples of suitable glasses include all passivation and sealing glasses from the SCHOTT technical glass catalogue. Furthermore, the glass can selected such that it consists mainly of oxides which can be reduced to their elemental form by a metal ("reducing metal") such as, but not limited to, aluminum or magnesium, at a comparatively low temperature. For example, if the glass has boron oxide, then by the following reaction, the boron oxide can be reduced to elemental boron, at a sufficiently high temperature:

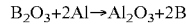

$$B_2O_3 + 2Al \rightarrow Al_2O_3 + 2B$$

Some metal powders exhibit properties so that they reduce the glass constituents in an exothermic reaction to their elements, which in turn can react exothermically with the main metal powder. In this case, the glass can be selected so that the melting point of the glass is lower than the melting point of each of the metal constituents, and thus most of the glass constituents can be reduced and reacted further by the metal powder mixture.

Suitable glass compositions for the glass powders of the present disclosure are mainly used in glass-to-metal sealing applications, with SCHOTT 58074 being one such example. Of those, glass compositions are preferred which contain $B_2O_3$, BaO, $Bi_2O_3$, $Cs_2O$, $K_2O$, $MoO_3$, $Na_2O$, $Nb_2O_5$, $P_2O_5$, PbO, $SiO_2$, $TeO_2$, $TiO_2$, $V_2O_5$, $WO_3$, ZnO, and less than 25 wgt % in total of $Al_2O_3$, CaO, $Gd_2O_3$, $La_2O_3$ or $Li_2O$. The glass compositions used for the present glass powders may also be free of $Al_2O_3$, CaO, $Gd_2O_3$, $La_2O_3$ or $Li_2O$. As with the metal powders, the glass is also milled, classified and mixed to obtain a desired particle size or particle size distribution.

The present disclosure also contemplates that the metal powder can be mixtures of multiple types and classes of metals. For example, the metal powder mixture can be a transition metal (e.g., molybdenum), and a lighter metal outside of that group (e.g., silicon). The metal mixtures can also be from the same groups of metals, such as two transition metals. It is known that certain mixtures of materials can react rapidly under the shock experienced after detonation of an explosive. These metal mixtures are therefore be of particular interest as a shaped composite material, due to the additional effects from this reaction, such as a high amount of energy released from an exothermic reaction, if they can be provided in a shape that is useful as a liner.

Additional metals suitable for the metal powder mixtures of the present disclosure, in addition to those provided above, are any elements from the periodic table that are commonly known as metals (e.g. alkali earth metals, metalloids). Of these, elements from Periods 2 through 4 (II-IV) are particularly suitable. Specific examples include, but are not limited to, magnesium, aluminum, copper, iron, nickel, niobium, molybdenum, silicon, tantalum, titanium, tungsten, vanadium, zirconium, or mixtures thereof. Specific metal powder mixtures (also known as "intermetallics" in the present disclosure) can thus include cobalt/titanium, copper/aluminum, iron/aluminum, molybdenum/silicon, niobium/germanium, nickel/aluminum, and titanium/nickel.

As discussed above, it is important to note that if the mixture consisted only of the above mentioned metal powders, the resulting composite would have a comparatively low strength, and change geometry under its own weight. The addition of wax or a polymer to the mix can increase mechanical strength, but it is only with the glass-bonding provided by the present disclosure that thin-walled liners can be provided in any shape of interest, particularly for a shaped charge liner application.

Referring to the drawings, FIG. 1 illustrates the functionality of the different constituents of the glass/metal composite of the disclosure, and shows potential reaction pathways which release energy in a series of exothermic reactions once the mixture is heated above a certain temperature. As stated before, the glass is selected so that its softening point is below the melting point of the metal constituents, for example by about 100 degrees Kelvin. If the composite material is used for a shaped charge application, it is believed that glass compositions that exhibit a shallow viscosity curve and a softening point above 500 degrees Celsius are preferable in order to avoid jet particulation, and provide sufficient ductility to produce a coherent jet.

Once the composite reaches the softening point of the glass, the glass constituents start to react with the metal constituents of the composite. A further temperature increase leads to the melting of the reducing metals, which in turn reduces glass constituents in an exothermic reaction to their elemental form. These constituents reduced to their elemental form then react further with the remaining constituents. The glass and metal constituents can be selected so that most of the occurring reactions are exothermic.

FIG. 2 provides an overview of oxides typically found in low-temperature sealing glasses together with their heat-of-reaction per mol of oxide and the associated equilibrium constant. A reaction is favorable if and only if the value for the heat-of-reaction is negative, i.e. the reaction is exothermic, and the logarithm of the equilibrium constant K is positive, i.e. the oxide can be reduced by the respective reducing metal.

The glass and metal powders (and intermetallics, if used) are mixed in the appropriate weight ratio to obtain a desired density of the mixture. The amount of glass powder in the mixture can be from 10 vol % to 90 vol %, or any subranges therebetween. Table 1 below shows suitable weight ranges for the oxides components of the glasses that can be used in the present composites.

a narrow, deep passage in a rock wall a conical shape that forms a narrow, jet after detonation would be suitable. If the user desires to clear a wide surface of a target, and is not as concerned with depth, the hemispherical shape of composite 300 would be more suitable.

Figure 4:
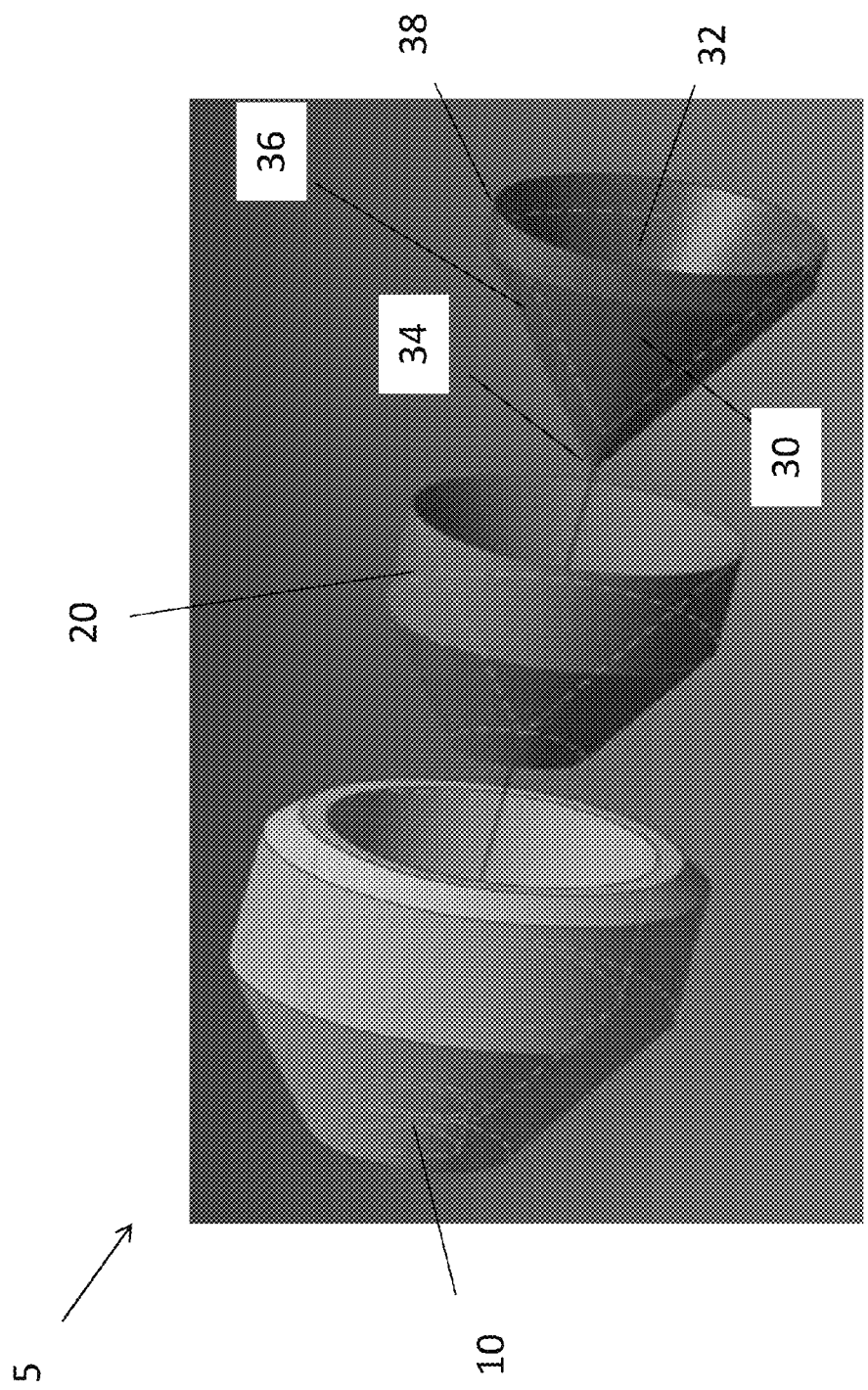
FIG. 4 shows a diagram of one type of shaped composite of the present disclosure.

Referring to FIG. 4, an explosive device 5, which is one specific application for the composite of the present disclosure, is shown. Device 5 includes casing 10, explosive 20, and composite 30, in axissymmetric alignment. In use, composite 30 is placed in the shell of explosive 20, and the two are in turn placed in casing 10. To set off the explosive 20, a detonator (not shown) on the outside of casing 10 triggers explosive 20. The explosion creates a very fast moving, super-sonic jet of material from the material of the composite 30, which can penetrate very dense and thick objects.

As shown in FIG. 4, composite 30 has a generally conical shape, with cone 36 tapering down in diameter from an open end 32 toward point end 34. Composite 30 can also have a constant diameter cuff 38 at open end 32. The shown embodiment is a conical shape with a constant-diameter cuff

TABLE 1

Compositional Ranges for typical low-temperature sealing glasses (Wgt %)

| Oxide | [g/mol] | Lead-Borate | Lead Phosphate | Lead-Silicate | Zinc Borate | Zinc-Phosphate | Lanthanum-Borate | Vanadium-Borate | Vanadium-Phosphate | Vanadium Glass |
|---|---|---|---|---|---|---|---|---|---|---|
| Al2O3 | 101.961 | 0-15 | 0-15 | 0-5 | | 0-10 | | | | 0-5 |
| As2O3 | 197.841 | | | | | | | | | |
| B2O3 | 69.618 | 10-30 | 1-5 | 0-15 | 20-30 | | 15-25 | 20-40 | | |
| BaO | 153.329 | | | | | | | 20-40 | | 15-25 |
| Bi2O3 | 465.959 | | | 0-5 | | | | | | |
| CaO | 56.079 | | | | | | | | | |
| CeO2 | 172.119 | | | | | 0-5 | | | | |
| Cs2O | 281.81 | | | 0-5 | | | | | 0-10 | |
| Gd2O3 | 362.498 | | | | | | | | | |
| K2O | 94.196 | | 10-20 | 0-5 | | 2-10 | | | | |
| La2O3 | 325.809 | | | | | | 30-50 | | | |
| Li2O | 29.881 | | | | | 0-5 | | | | |
| MoO3 | 143.938 | | | | | 0-10 | | | | 0-5 |
| Na2O | 61.979 | | 3-13 | | | 2-10 | | | | |
| Nb2O5 | 265.81 | | | | | | 5-15 | | | 0-5 |
| P2O5 | 141.945 | | 40-50 | | | 35-50 | | | 20-30 | |
| PbO | 223.199 | 60-90 | 10-25 | 40-70 | | | | | | |
| Sb2O3 | 291.498 | | | | 0-2 | | 0-2 | | | |
| SiO2 | 60.084 | 0-10 | | 25-50 | 5-15 | | 0-10 | | | 0-5 |
| SnO2 | | | | | | 2-10 | | | | |
| SrO | 103.619 | | | | | | | | | |
| Ta2O5 | 441.893 | | | | | | | | | 0-5 |
| TeO2 | 159.599 | | | | | | | | | 0-5 |
| TiO2 | 79.899 | | | | | | 0-5 | | | |
| V2O5 | 181.88 | | | | | | | 20-60 | 60-80 | 50-60 |
| WO3 | 231.848 | | | | | 0-10 | 0-10 | | | |
| ZnO | 81.379 | | | | 45-75 | 25-50 | 15-30 | | | 5-15 |
| ZrO2 | 123.219 | | | | | | 0-5 | | | |

Referring to FIGS. 3a-3c, possible shapes for the composites of the present disclosure are shown. In FIG. 3a, composite 100 has a conical shape, with a rounded end 102 and open end 104. In use, open end 104 would be pointed at a target. A detonator and explosive (not shown) would be placed behind rounded end 102, to start the reaction. The material of composite 100, after detonation, would then form a jet that would strike the desired target. Similarly, composite 200 of FIG. 3b, with rounded end 202 and open end 204 has a parabolic shape. Composite 300 of FIG. 3c is hemispherical, and has rounded end 302 and open end 304. Flat discs are also contemplated as shapes for the composites of the present disclosure.

The particular shape of the composite will be dictated by the application for which it is used. If a user desires to for at one end, but the present disclosure contemplates several additional shapes, such as hemispherical and conical, combinations thereof, and with or without constant diameter cuffs. In one embodiment of composite 30, the diameter of cuff 38 can be from one inch to ten inches, or any subranges therebetween.

In the shapes for the composites of the present disclosure, such as those shown in FIGS. 3a-4 or others, the shape can have a wall thickness. The thickness can be determined by the specific application contemplated. However, one of the advantages of the composites of the present disclosure is that the composites can be molded or formed into a shape that has a smaller thickness than currently available devices. The glass-bonded metal powders of the present composites are stronger because when the glass particles melt, they fill voids between metal particles. In addition, the metal and glad powders form chemical bonds and react with one another during the processing of the composite. With composites that are made of metal powder or glass powder alone, the device can be brittle, or collapse under its own weight. With composites that use metal powders only, the particles deform when they are pressed against each other, and form a mechanical or locking bond. This mechanical bond is not as strong as the chemical bond that exists between metal and glass powders in the composites of the present disclosure. Thus, the present composites can be relatively thin, still maintain their structural integrity, and resist cracking, chipping, or deformation.

The wall thickness of the composites of the present disclosure can be from 0.5 millimeters to 10.0 millimeters, or any subranges therebetween. In another embodiment, the wall thickness of the composites can be from 0.7 millimeters to 3.0 millimeters, or any subranges therebetween. In another embodiment, the wall thickness of the composites can be from 1.0 millimeters to 1.5 millimeters, or any subranges therebetween. The thickness can vary throughout the composite.

Figure 5A:
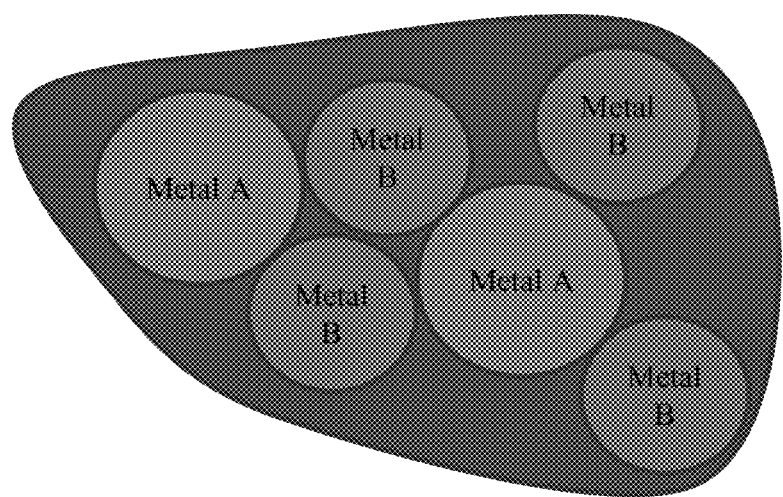
FIGS. 5a and 5b are schematic drawings of the porosities of different embodiments of the composites of the present disclosure.
Figure 5B:
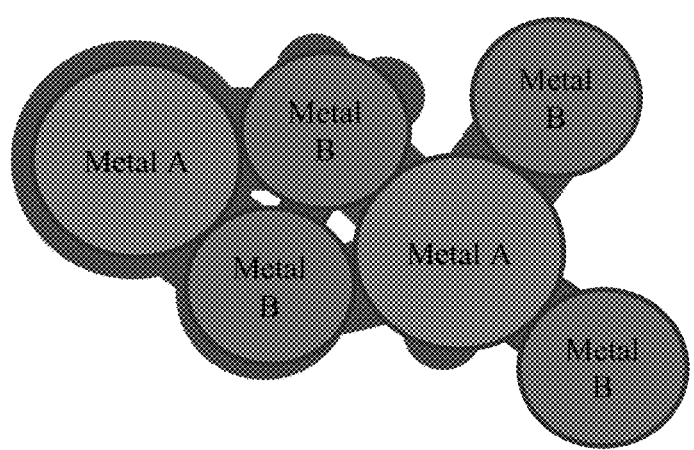

One other advantage to bonding metal and glass powders in the composites of the present disclosure is that the porosity of the composite can be controlled. In one embodiment, the metal and glass powders can be selected so that the resulting composite can have a net-shape or near-net-shape part of the before mentioned composite materials that exhibit a controlled porosity. In one embodiment, the porosity can be 5% residual porosity or less. In another embodiment, the porosity can be from 5% to 50%, or any subranges therebetween. In a further embodiment, the porosity can be from 10% to 30%, or any subranges therebetween. A schematic drawing of a completely or almost completely dense composite with a mixture of different types of metal powder is shown in FIG. 5a. An example of a composite with an increased and more controlled porosity is shown in FIG. 5b.

The porosity can be controlled by selecting an appropriate glass powder and/or metal powder particle-size and weight ratio, and consolidating the glass/metal powder mixture in a pressure-less sintering process, as described in greater detail below. Particle sizes can affect the porosity because when the metal and glass powders have significantly different sizes, the smaller particles will fill the voids between the larger particles. If very low porosity is desired, there can be a significant different between the particle sizes of the metal and glass powders, or vice versa. If a higher porosity is desired, then the particles can be selected so that they are closer in size, and thus cannot fill voids. The particles sizes of both the metal and glass powders can be manipulated in this way. Another way that the porosity of the present composites can be controlled is that the glass powder particles melt before the metal ones do, and thus fill in voids between the metal particles. Thus, the amount of glass particles used can help control the porosity as well.

After sintering, the composite can also be infiltrated with another material that includes a source of carbon, fluorine, or an oxidizer, such as a polymer. Examples include, but are not limited to, poly(propylene carbonate) (e.g., EMPOWER QPAC® 40), Teflon®, or diiodine pentoxide to enhance the reaction of the constituents under conditions typical for shaped charges or high-velocity impacts. In this case the sintered composite provides a stiff scaffold with high collapse strength to the polymer, thereby improving shelf life of the component and increasing performance. Alternatively, the pores can be filled with a reactive material making the composite useful as an armor component or projectile. The control of the composite porosity enables the tuning of the composite density, as well as the amount and distribution of the filler material, all of which are important for the reaction of the constituents. Both the fully dense composite and the composite with controlled porosity can be easily ground and polished into a final, desired shape. This enables the adjustment of the surface figure and geometry, which can be particularly useful if the composite material is used as a shaped charge liner. As discussed above, this fine-tuning capability may not be positive with shaped materials that are made solely of metal or glass powder, since they can be too brittle to withstand such fine-tuning.

The appropriate weight amounts for the glass and metal powders will depend on the specific materials used, and the desired porosity. The amount of glass powder in the mixture can be from 10 vol % to 90 vol %, or any subranges therebetween. In another embodiment, the amount of glass powder in the mixture can be from 35 vol % to 65 vol %, or any subranges therebetween.

Similarly, the particle sizes of the metal powders and glass powders can be selected to achieve the desired porosity of the final composite. In one embodiment, the metal powders can have a particle size of 150 micrometers or less, or any subranges thereof. In another embodiment, the metal powders can have a particle size of 75 micrometers or less, or any subranges thereof. In a further embodiment, the metal powders can have a particle size of 25 micrometers or less, or any subranges thereof. The glass powder can have a particle size of from 75 micrometers to 150 micrometers, or any subranges therebetween. The ratio of particle sizes between the glass and metal powders can be such that a particle size distribution for glass and metal can satisfy the equation $d_x^{glass} > d_x^{metal}$, or $d_x^{glass}/d_x^{metal} > 1.25$, i.e the glass particles are substantially larger than the metal particles. In another embodiment, the particle sizes can be governed by the equation $d_x^{glass}/d_x^{metal} < 1.25$, i.e. the glass particles are of comparable or substantially smaller size than the metal particles. The desired particle sizes of each of the metal and glass powders can be achieved by milling and then passing the powders through a sieve of a desired size.

Example processes for preparing the composites of the present disclosure can be as follows. In a first embodiment:
(a) Materials Selection
   i. Select a metal (e.g., tungsten, molybdenum, or the other suitable metals discussed above), and obtain powder therefrom with a particle size distribution so that the dry packing density is 50% or higher;
   ii. Select a glass from the following, but not limited to, families: borosilicate, alumino-silicate, lead-silicate, soda-lime-silicate, lanthanum-crown, alumino-phosphate, or a combination thereof;
     a. The coefficient or thermal expansion (CTE) mismatch between the glass and the heavy metal [tungsten, molybdenum, other] can be less than 2 ppm absolute; and
     b. The softening point of the glass can be 100K or more below the melting point of the metal powder.
(b) Batching and Mixing
   i. Mill the glass, and classify glass powder to obtain particle size distribution so that $d_x^{glass} > d_x^{metal}$, preferably $d_x^{glass}/d_x^{metal} > 1.25$ with x=(0,100);
   ii. Intimately mix the glass and metal powders in the appropriate weight ratio to obtain desired final density (e.g. the 10 vol %-90 vol % of glass discussed above), for example by using a V-blender (such as Twin Shell Dry V-Blender; The Patterson Kelley Co, Inc.; East Stroudsburg, Pa.; blend for up to 24 h) or an acoustic mixer (such as ResoDyn LabRAM; ResoDyn; Butte, Mont.; mix for 30 min @ 10 g);

(c) Fabricate a "green part" by uniaxial cold-pressing the mixture described in step (b) above into a desired shape;
   i. Prepare a paste by mixing the dry glass and metal powder mixture with water, alcohol or a common organic binder (such as EMPOWER QPAC40 or EMPOWER QPAC25);
   ii. Dispense an appropriate amount of the paste into a graphite mold, or a refractory ceramic or metal mold coated with an appropriate release agent such as graphite or boron nitride;
   iii. Form the paste into a thin shell by pressing and turning an appropriately shaped die in the mold;
   iv. Remove the die, and either try the resulting green part in the mold, or transfer it to an appropriately shaped graphite or refractory ceramic post coated with a suitable organic binder (such as EMPOWER QPAC40 or EMPOWER QPAC25);

(d) Sintering
   i. Place the mold or post with the green part in an oven, and pressure-less sinter it into a part with a desired (i.e., less than 25%) residual porosity under a forming gas [Nitrogen with 5% Hydrogen];

(e) Finishing
   i. Remove the part from the mold or post;
   ii. If necessary fine-grind surface and/or rim of part;
   iii. If desired, coat part with a polymer such as EMPOWER QPAC40.

In a second embodiment, the process for making a thin-walled glass/metal composite with controlled porosity is as follows:

(a) Materials Selection
   i. Select a metal (e.g., tungsten, molybdenum, or other suitable metals), and obtain powder(s) therefrom with particle size distribution(s) so that the dry packing density is 50% or higher;
   ii. Select glass or glass-ceramic from, but not limited to, the following families: borosilicate, alumino-silicate, lead-silicate, soda-lime-silicate, lanthanum-crown, alumino-phosphate, fluoro-phosphate, lithium-alumino-silicate capable of bonding the selected metal powders; preferably the
      a. CTE mismatch between the glass and the metal powder is less than 2 ppm absolute; and
      b. the softening point of the glass is preferably 100K or more below the melting point of the metal powder;

(b) Batching and Mixing
   i. Mill glass, and classify glass powder to obtain particle size distribution such that $d_x^{glass}/d_x^{metal}<1.25$, $x=(0,100]$;
   ii. Intimately mix glass and metal powders in the appropriate weight ratio to obtain desired final density (e.g. 10 vol %-90 vol % of glass), for example by using an acoustic mixer (such as ResoDyn LabRAM; ResoDyn; Butte, Mont.; mix for 30 min @ 10 g);

(c) Fabricate a Green Part, for example by uniaxial cold-pressing into desired shape;
   i. Prepare a paste by mixing the dry metal glass powder mixture with water, alcohol, or a common organic binder exhibiting a low burn-out temperature (such as EMPOWER QPAC40 (Poly(propylene carbonate)) or EMPOWER QPAC25 (Poly(ethylene carbonate));
   ii. Dispense an appropriate amount of the paste into a graphite mold, or a refractory ceramic or metal mold coated with an appropriate release agent such as graphite, silicone or boron nitride;
   iii. Form the paste into a thin shell by pressing and turning an appropriately shaped die in the mold;
   iv. Remove the die, and either dry the resulting green part in the mold, or transfer it to an appropriately shaped graphite or refractory ceramic post by inserting an appropriately shaped graphite or refractory ceramic post coated with a suitable organic binder (such as EMPOWER QPAC40 or EMPOWER QPAC25);

(d) Sintering
   i. Place the mold or post with the green part in an oven, and pressure-less sinter it under forming gas (for example Argon or Nitrogen with 5% Hydrogen) into a part with 5% to 50% residual porosity (e) Finishing
   i. Remove part from mold or post;
   ii. If necessary, fine-grind surface and/or rim of part;
   iii. If desired, infiltrate and/or coat part with a suitable polymer including but not limited to poly(propylene carbonate), Poly(ethylene carbonate) or Teflon®, or other materials which enhance the properties of the metal powders.

As discussed above, in some cases it can be advantageous to use an intermetallic powder mixture in addition to the heavy metal mixtures described in the process above. A third embodiment of the process for manufacturing the composites is as follows:

a) Materials Selection
   i. Select a heavy metal (e.g., tungsten, molybdenum, or others, as described above), and obtain a powder therefrom with a particle size distribution such that the dry packing density is 50% or higher;
   ii. If desired, select reactive metal mixture from the following, but not limited to, material groups: cobalt/titanium, copper/aluminum, iron/aluminum, molybdenum/silicon, niobium/germanium, nickel/aluminum and titanium/nickel. Depending on the materials and their particle size steps (b) and (c) below might have to be executed under inert and/or dry atmosphere;
   iii. Select glass or glass-ceramic from, but not limited to, the following families: borosilicate, alumino-silicate, lead-silicate, soda-lime-silicate, lanthanum-crown, alumino-phosphate, fluoro-phosphate, lithium-alumino-silicate capable of bonding the selected metal powders; preferably the
      a. CTE mismatch between the glass and the heavy metal [tungsten, molybdenum, other] is less than 2 ppm absolute; and
      b. If reactive metal mixtures are used, and these are incorporated into the material during sintering, the softening point of the glass is preferably 100K or more below the initiation temperature;

b) Batching and Mixing
   i. Mill glass, and classify glass powder to obtain particle size distribution such that $0.75<d_x^{glass}/d_x^{metal}<1.25$, with $x=(0,100]$;
   ii. Intimately mix glass and metal powders in the appropriate weight ratio to obtain desired final density (e.g. 10 vol %-90 vol % of glass), for example by using a V-blender (such as Twin Shell Dry V-Blender; The Patterson Kelley Co, Inc.; East Stroudsburg, Pa.; blend for up to 24 h) or an acoustic mixer (such as ResoDyn LabRAM; ResoDyn; Butte, Mont.; mix for 30 min @ 10 g);

c) Fabricate a Green Part, for example by uniaxial cold-pressing into desired shape;

i. Prepare a paste by mixing the dry heavy metal, intermetallics (if used), and glass powder mixture with water, alcohol, or a common organic binder exhibiting a low burn-out temperature (such as EMPOWER QPAC40 (Poly (propylene carbonate)) or EMPOWER QPAC25 (Poly(ethylene carbonate));

ii. Dispense an appropriate amount of the paste into a graphite mold, or a refractory ceramic or metal mold coated with an appropriate release agent such as graphite or boron nitride;

iii. Form the paste into a thin shell by pressing and turning an appropriately shaped die in the mold;

iv. Remove the die, and either try the resulting green part in the mold, or transfer it to an appropriately shaped graphite or refractory ceramic post;

d) Sintering i. Place the mold or post with the green part in an oven, and pressure-less sinter it under forming gas (Nitrogen with 5% Hydrogen) into a part;
   a. with less than 5% residual porosity to be coated or used as-is, or
   b. with 5% to 50% residual porosity to be filled with appropriate polymer e) Finishing i. Remove part from mold or post;

ii. If necessary, fine-grind surface and/or rim of part;

iii. If desired, fill pores with reactive metal mixture, or polymer/-reactive metal mixture;

iv. If desired, coat or infiltrate part with polymer such as EMPOWER QPAC40 or Teflon.

In addition to the three processes described above, other approaches to obtain net-shape parts and the composites of the present disclosure include sintering of green parts obtained by cold isostatic pressing (CIP, as opposed to the non-isostatic cold pressing described above), uniaxial hot-pressing, hot-isostatic pressing (HIP), selective laser sintering, or injection molding. The sintered composite prepared according to the methods described above can also be re-pressed under a controlled atmosphere in a hot-press to form different shapes, if desired. The powder-based sintering approach alleviates any issue associated with devitrification, and enables the fabrication of composite materials with densities of up to 14 g/ccm.

Figure 6:
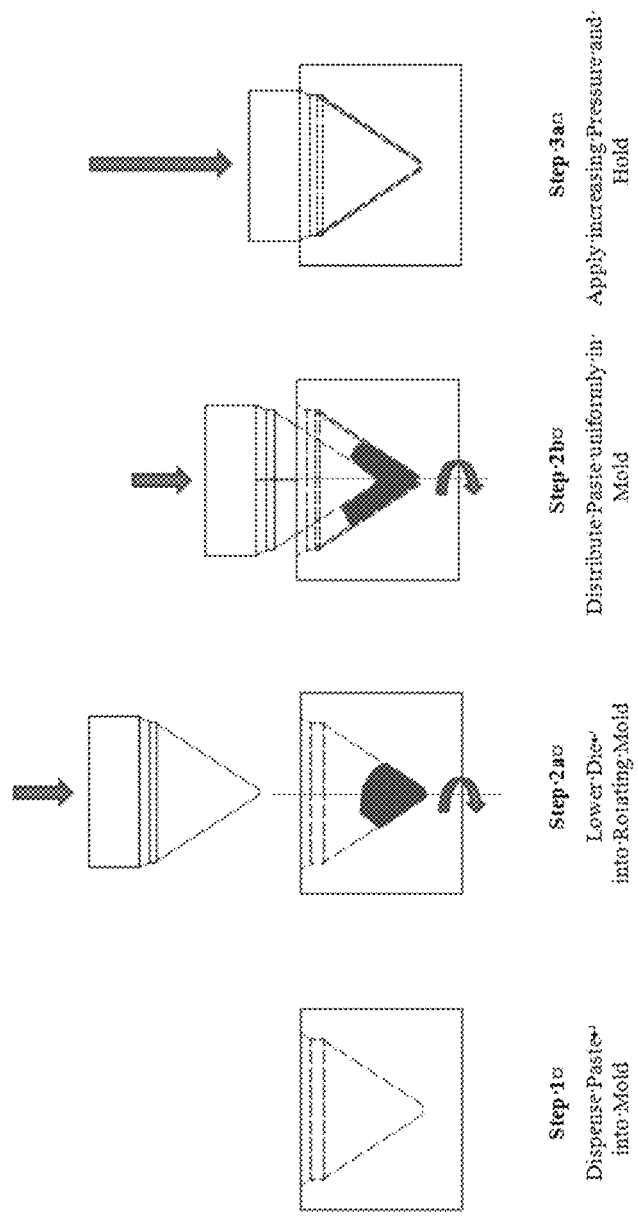
FIGS. 6-8 are schematic diagrams depicting processes of manufacture of the shaped charge liners of the present disclosure.
Figure 7:
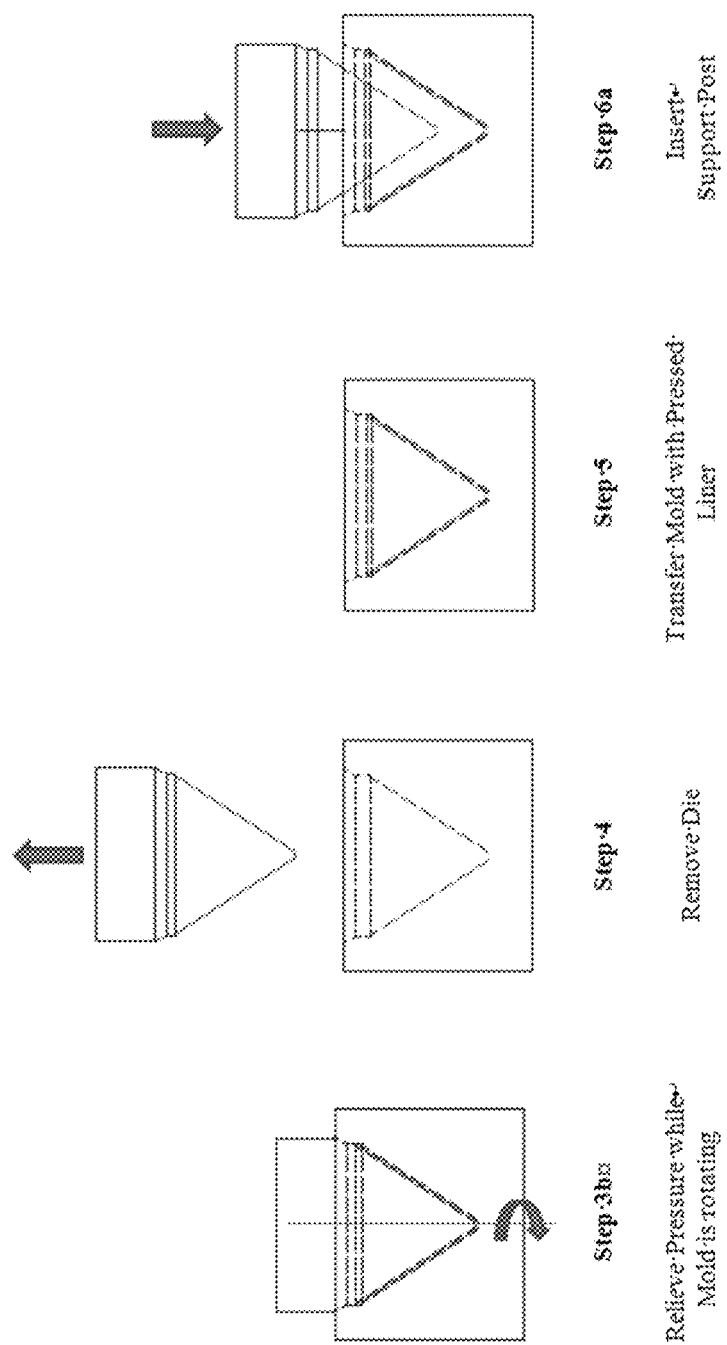
Figure 8:
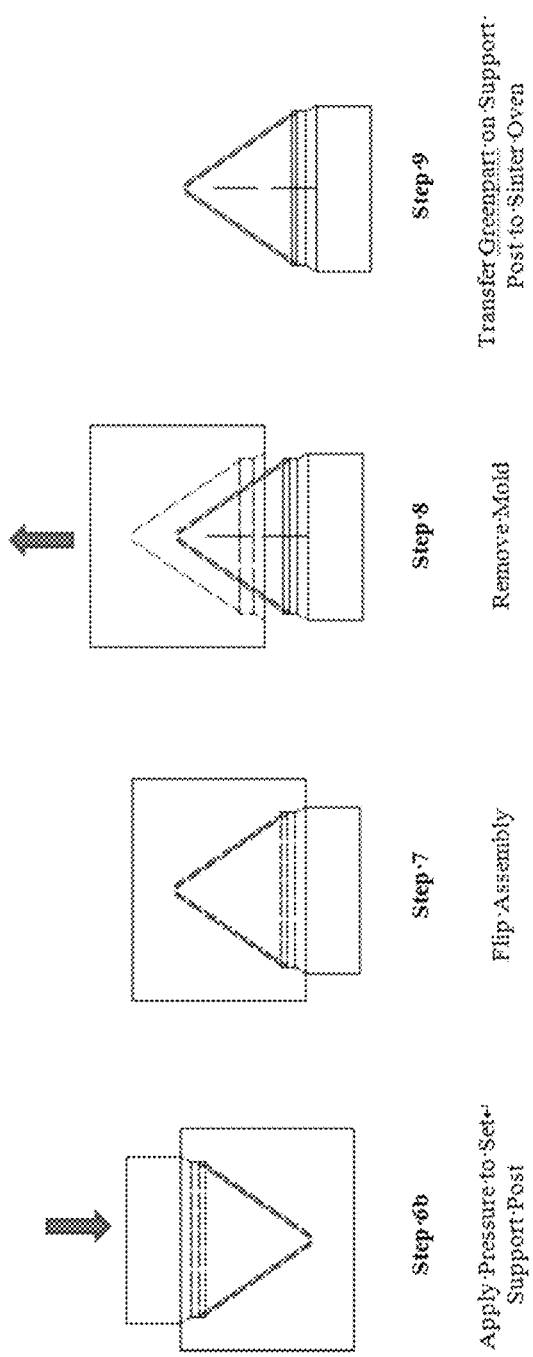

Schematic diagrams representing the processes described above are shown in FIGS. 6-8.

The following are specific Examples of preparations of the composites of the present disclosure.

Example 1

Tungsten powder (Buffalo Tungsten, Grade SR; tap density 12.3 g/ccm) was blended dry with glass powder (SCHOTT N-Lak8; −100/+200 US Standard Mesh; CTE[20, 300] about 6.7 ppm/K) in a weight ratio of 88:11.5 using an acoustic mixer (ResoDyn LabRAM, 30 min @ 10 g). Then, a homogenous paste was prepared by blending the glass/metal powder with an organic binder (EMPOWER QPAC-40 dissolved in 90 wt % dry acetone) in a weight ratio of (88:11.5):0.5 using an acoustic mixer (ResoDyn LabRAM, 30 min @ 10 g). About 20 g of the paste was pressed into a thin disc, transferred to a graphite support, and pressure-less sintered under H5N forming gas (nitrogen with 5% hydrogen) at 800 degC. for 1 h. The finished part had a density of about 12.8 g/ccm, with 13.1 g/ccm being fully dense, and an equibiaxial flexure strength in excess of 75 MPa. The composite is stable under ambient conditions, and did not show any visible degradation after more than 12 months of storage.

The theoretical maximum density for the materials in example 1 (W-NLaK8) depends on the amount of glass, and follows the rule of mixtures; for a shaped charge application the amount of glass for a fully dense material ranges from about 35 vol % to about 60 vol %, the density thereby ranges from 13.85 g/ccm to 7.73 g/ccm. For the tungsten powder used, the open space between optimally packed particles is about 1-(12.6 g/ccm [packing density of this W powder] divided by 19.25 g/ccm [density of W]), which amounts to about 35%. Using less than 35 vol % glass leads to a porous part since not all the free space between tungsten particles can be filled with glass. Using more than 35 vol % of glass is necessary, but not sufficient, to obtain a fully dense part since the mixture of glass and metal powder has a lower packing density after pressing. If the glass powder is substantially smaller than the refractory metal powder the metal powder particles will bridge and lock during pressing, with fine glass particles filling the voids between metal particles; the packing density of the fine glass particles will be around 65% at best. During sintering the part shows no substantial shrinkage in its outer dimension (since the refractory metal particles cannot move), and only 65% of the space between the tungsten particles will be filled with glass. Since the packing density of the refractory metal particles in the glass/refractory metal mix is lower than the optimum packing density, a porosity in the range of about 10% to about 30% can be achieved.

TABLE 2

| Glass Composition | | |
|---|---|---|
| Oxide | N-LaK8 Wgt % | S8074 Wgt % |
| Al$_2$O$_3$ | | 10.05 |
| B$_2$O$_3$ | 40.37 | 3.59 |
| CaO | 5.80 | |
| K$_2$O | | 14.03 |
| Na$_2$O | | 8.02 |
| P$_2$O$_5$ | | 46.98 |
| PbO | | 17.41 |
| ZnO | 5.71 | |
| ZrO$_2$ | 4.30 | |
| La$_2$O$_3$ | 41.30 | |
| Sb$_2$O$_3$ | 0.20 | |

TABLE 3

| Glass Properties | | | |
|---|---|---|---|
| | | N-LaK8 | S8074 |
| Density | [g/ccm] | 3.749 | 3.01 |
| Tg | [C.] | 643 | 395 |
| Softening Point | [C.] | 717 | 480 |
| alpha 20/300 | [10−6 m/K] | 6.7 | 17.11 |
| Young's modulus (E) | [GPa] | 115 | |
| Poisson ratio (μ) | [ ] | 0.289 | |
| Knoop hardness (HK) | | 740 | |

Example 2

Tungsten powder (Buffalo Tungsten, Grade SR; tap density 12.3 g/ccm) was blended dry with glass powder (SCHOTT N-Lak8; −100/+200 US Standard Mesh; CTE[20, 300] about 6.7 ppm/K) in a weight ratio of 88:11.5 using an acoustic mixer (ResoDyn LabRAM, 30 min @ 10 g). Then, a homogenous paste was prepared by blending the glass/metal powder with an organic binder (EMPOWER QPAC-40 dissolved in 90 wt % dry acetone) in a weight ratio of (88:11.5):0.5 using an acoustic mixer (ResoDyn LabRAM, 30 min @ 10 g). About 20 g of the paste was pressed into a thin-walled bell shape, transferred to an appropriate graphite support, and pressureless sintered under H5N forming gas at 800 degC. for 1 h. The finished part had a uniform density of about 12.8 g/ccm, with 13.1 g/ccm being fully dense, and an average wall thickness of about 1.0 mm. The composite is stable under ambient conditions, and did not show any visible degradation after more than 12 months of storage.

Example 3

A mixture of tungsten powder (Buffalo Tungsten, Grade SR; tap density 12.3 g/ccm) and aluminum powder (Alfa Aesar) was blended dry with glass powder prepared (SCHOTT ALSG 8074; −200 US Standard Mesh; CTE[20, 300] about 17.11 ppm/K) in a weight ratio of 14.5:2.3:3.2 using an acoustic mixer (ResoDyn LabRAM, 30 min @ 10 g). Then, a homogenous paste was prepared by blending the glass/metal powder with an organic binder (EMPOWER QPAC-40 dissolved in 90 wt % dry acetone) in a weight ratio of (14.5:2.3:3.2):0.5 using an acoustic mixer (ResoDyn LabRAM, 30 min @ 25 g). Green disks with a diameter of 1.25" and a thickness of about 4.5 mm where obtained by pressing about 20 g of the paste in a steel die applying a peak load of 20 t for 1 min, and then releasing the load at a rate of 20 t/min. The disks where then placed on an appropriate graphite support, and pressure-less sintered in H5N forming gas at 500 deg C. for 2 h. The finished parts had a density of 5.5 g/ccm with 7.5 g/ccm being fully dense, and an equibiaxial flexure strength in excess of 30 MPa. The composite material was flammable, and showed a strong exotherm at about 674 degC.; the energy density of the composite exceeded 0.7 kJ/g.

The example shows that metal powders with widely different thermal expansions can be bonded with a suitable glass to obtain a glass/metal composite while preserving or enhancing their thermochemical properties.

To evaluate reactivity of the mixture, sintered samples of the mixture where then infiltrated with EMPOWER QPAC-40 as a carbon source, and after drying for 72 h heated to 700C at a rate of 100K/min in reducing atmosphere. The ensuing exothermic reaction reduced the sintered disks to a fine powder. Elemental mapping with SEM/EDS indicates that the reaction products have a uniform composition. The XRD spectra indicate that the aluminum metal powder reduced with the exception of aluminum oxide all constituents of the glass, and that the reduced glass constituents then reacted with the remaining tungsten (having impurities of Mn, Cr, Co) and aluminum present to form W2B, Mn2P, Mn4B4, and AlP; the carbon from the polymer reacted with the tungsten to from WC and W2C.

Example 4

A thermite mixture of manganese dioxide (Baltimore Finished Goods, −80/+200 US Standard Mesh) and aluminum powder (Alfa Aesar) was blended dry with glass powder prepared from SCHOTT ALSG 8074 (−200 US Standard Mesh; CTE[20,300] about 17.11 ppm/K) in a weight ratio of 10:2.23:3.75 using an acoustic mixer (ResoDyn LabRAM, 30 min @ 10 g). Then, a homogenous paste was prepared by blending the glass/metal powder with an organic binder (EMPOWER QPAC-40 dissolved in 90 wt % dry acetone) in a weight ratio of (10:2.23:3.75):0.5 using an acoustic mixer (ResoDyn LabRAM, 30 min @ 25 g). Green disks with a diameter of 1.25" and a thickness of about 2.5 mm where obtained by pressing about 6 g of the paste in a steel die applying a peak load of 20 t for 1 min, and then releasing the load at a rate of 20 t/min. The disks where then placed on an appropriate graphite support, and pressure-less sintered in air at 500 deg C. for 2 h. The finished parts had a density in excess of 3 g/ccm with 3.95 g/ccm being fully dense, and an equibiaxial flexural strength in excess of 20 MPa. The composite was flammable, and the energy density exceeded 0.7 kJ/g.

The optimum porosity depends on the glass/metal system, and the reaction pathways employed. In case of Example 4 an open porosity of about 25% is enough to infiltrate and coat the composite material with poly(propylene carbonate) [EMPOWER QPAC40; (C4H6O3)n] and provide enough carbon to convert the tungsten into WC and W2C.

The example shows that select thermite powder mixtures can be bonded with a suitable glass to obtain a rigid composite while preserving and/or enhancing the reactivity of the mixture.

One of the contemplated applications for the composites of the present disclosure are charge liners that can be used in oil- and gas-well completion. The liners are made from glass-bonded metal powders as described above, exhibiting high collapse strength and improved penetration performance (hole-depth and -geometry, no slug-formation) under borehole conditions. The material in a conical or said bell shape is especially useful as a high-density shaped charge liner which exhibits a high collapse strength and combines the dynamic properties of the glass with the high density and hardness of the metal powder. The composites of the present disclosure can also be used in any number of explosive or pyrotechnic applications.

Again, there are several advantages provided by the liners of the present disclosure. Among these are:

The bonding of heavy-metal powders such as, but not limited to, molybdenum, tantalum, uranium and tungsten with a suitable glass such that the morphology of the metal powder is preserved;

The bonding of heavy-metal powders such as tungsten or molybdenum with a suitable glass so that the resulting material has a density of more than 7.5 and a collapse strength exceeding the one of liners fabricated by cold-pressing metal powders;

The bonding of heavy-metal powders such as tungsten or molybdenum with a suitable glass such that the resulting material has a density of more than 7.5, a collapse strength exceeding the one of liners fabricated by cold-pressing metal powders, and constituents of the glass enhance reactivity of the metal constituents under shocked condition;

The bonding of metal powder mixtures of aluminum, copper, iron, nickel, niobium, molybdenum, silicon, tantalum, tungsten, vanadium and zirconium in their stoichiometric ratios with a suitable glass to obtain intermetallics such as nickel/aluminum, copper/titanium, copper/aluminum, iron/aluminum, niobium/germanium, titanium/nickel, niobium/aluminum, copper/silicon, molybdenum/silicon, niobium/silicon, tantalum/silicon, vanadium/silicon, tungsten/silicon, zirconium/silicon under shock conditions;

The bonding of heavy-metal powders (such as tungsten, molybdenum, tantalum, uranium) and/or reactive stoichiometric metal mixtures using a suitable glass;

The bonding of heavy-metal powders (such as tungsten, molybdenum, tantalum, uranium) and/or reactive stoichiometric metal mixtures using a suitable glass (such as a fluoro-phosphate) which enhances the reaction of the metallic components under shock conditions;

Obtaining a near-net-shape or net-shape part with less than 5% residual porosity by selecting an appropriate glass/metal particle-size and weight ratio, and consolidating the glass/metal powder mixture in a pressure-less sintering process;

Obtaining a near-net-shape or net-shape part with 5% to 50% open porosity by selecting an appropriate glass/metal particle-size and weight ratio, consolidating the glass/metal powder mixture in a pressure-less sintering process, and infiltrating the porous part with another material such as Teflon to enhance the of the metal constituents under shocked condition;

Obtaining a near-net-shape or net-shape part with 5% to 50% open porosity by selecting an appropriate glass/metal particle-size and weight ratio, consolidating the glass/metal powder mixture in a pressure-less sintering process, and filling the pores with a reactive metal mixture;

Obtaining a near-net-shape or net-shape shaped-charge liner by selecting an appropriate glass/metal particle size ratio, and consolidating the glass/metal powder mixture in a pressure-less sintering process;

Providing a glass/metal composite which can easily be ground and polished;

Combining the dynamic properties of certain glasses (brittle at ambient conditions, ductile during jet formation) with the properties of certain metal powders, inert or reactive (high density, high hardness, high melting point);

Sintering, with traditional sintering methods, the liners into a fully dense, thin-walled part with high collapse strength and durability;

Sintering, with traditional sintering methods, the liners into a porous, thin-walled part which exhibits comparatively high collapse strength and durability, and which can be infiltrated with shock-reactive materials or materials enhancing the reaction of the constituents;

Using the above-described materials as a shaped charge liner;

Bonding metal powder mixtures of aluminum, copper, iron, nickel, niobium, molybdenum, silicon, tantalum, tungsten, vanadium and zirconium in their stoichiometric ratios with a suitable glass to obtain intermetallics such as nickel/aluminum, copper/titanium, copper/aluminum, iron/aluminum, niobium/germanium, titanium/nickel, niobium/aluminum, copper/silicon, molybdenum/silicon, niobium/silicon, tantalum/silicon, vanadium/silicon, tungsten/silicon, zirconium/silicon under shock conditions;

Bonding heavy-metal powders such as tungsten, molybdenum, tantalum, uranium and/or reactive stoichiometric metal mixtures using a suitable glass; and Bonding heavy-metal powders (such as tungsten, molybdenum, tantalum, uranium) and/or reactive stoichiometric metal mixtures using a suitable glass (such as a fluoro-phosphate) which enhances the reaction of the metallic components under shock conditions.

While the present disclosure has been described with reference to one or more particular embodiments, it will be understood by those skilled in the art that various changes may be made and equivalents can be substituted for elements thereof without departing from the scope thereof. In addition, many modifications can be made to adapt a particular situation or material to the teachings of the disclosure without departing from the scope thereof. Therefore, it is intended that the disclosure not be limited to the particular embodiment(s) disclosed as the best mode contemplated for carrying out this disclosure.

The invention claimed is:

1. A shaped composite, comprising:
a first phase comprising a metal powder mixture, wherein said metal powder mixture comprises a first metal powder selected from the group consisting of molybdenum, tantalum, uranium, tungsten, and any combinations thereof, and a second metal powder selected from the group consisting of magnesium, aluminum, copper, iron, nickel, niobium, molybdenum, silicon, tantalum, titanium, tungsten, vanadium, zirconium, and any combinations thereof, wherein metal powder mixture in said first phase has a particle size of 25 micrometers or less; and
a second phase comprising a glass powder,
wherein said metal powder mixture in said first phase is bonded with said glass powder in said second phase,
wherein said glass powder is present in an amount of 10% to 90% by volume of the shaped composite,
wherein said shaped composite has a porosity of between 5% and 50%, and
wherein said metal powder mixture and said glass powder are selected so that when the composite is heated to a softening point of said glass powder, an exothermic reaction is initiated within the shaped composite, so that a majority of said glass powder is reduced to its elemental form by said metal powder to form reaction products, and said reaction products react exothermically with other constituents of the shaped composite or with materials in contact with the shaped composite.

2. The shaped composite of claim 1, wherein said glass powder comprises a material selected from the group consisting of borosilicate, alumino-silicate, lead-silicate, soda-lime-silicate, lanthanum-crown, alumino-phosphate, lead-borate, boro-phosphate, zinc-borate, zinc-phosphate and any combinations thereof.

3. The shaped composite of claim 1, wherein the shaped composite has either a conical, parabolic, or hemispherical shape.

4. The shaped composite of claim 1, wherein said glass powder comprises a material containing an oxide selected from the group consisting of $B_2O_3$, $BaO$, $Bi_2O_3$, $Cs_2O$, $K_2O$, $MoO_3$, $Na_2O$, $Nb_2O_5$, $P_2O_5$, $PbO$, $SiO_2$, $TeO_2$, $TiO_2$, $V_2O_5$, $WO_3$, $ZnO$, and any combinations thereof.

5. The shaped composite of claim 1, wherein said glass powder is made from a material that is free of $Al_2O_3$, $CaO$, $Gd_2O_3$, $La_2O_3$ or $Li_2O$.

6. The shaped composite of claim 1, wherein the shaped composite has a thickness of between 0.7 millimeters and 10 millimeters.

7. The shaped composite of claim 1, wherein said glass powder has a particle size between 75 micrometers and 150 micrometers.

8. The shaped composite of claim 1, wherein a ratio of a particle size of said glass powder to said particle size of said metal powder mixture is greater than 1.

9. The shaped composite of claim 1, wherein a ratio of a particle size of said glass powder to said particle size of said metal powder mixture is less than 1.

10. The shaped composite of claim 1, wherein said second metal powder is selected from the group consisting of aluminum, magnesium, silicon, titanium, zirconium, and any combinations thereof; and
said first phase further comprises a metal oxide selected from the group consisting of oxides of bismuth, oxides of boron, oxides of copper, oxides of chromium, oxides of manganese, oxides of iron, oxides of molybdenum, oxides of silicon, and any combinations thereof.

11. The shaped composite of claim 1, wherein said exothermic reaction occurs at 647 degrees Celsius.

12. The shaped composite of claim 1, wherein said second metal powder is selected from the group consisting of magnesium, aluminum, molybdenum, silicon, tantalum, titanium, tungsten, zirconium, and any combinations thereof.

13. The shaped composite of claim 1, wherein said first phase consists of said metal powder mixture.

14. The shaped composite of claim 1, wherein said first metal powder and said second metal powder are elemental metal powders.

15. The shaped composite of claim 1, wherein said glass powder is present in an amount of 20% to 90% by volume of the shaped composite.

16. A shaped composite, comprising:
a first phase comprising a metal powder mixture, wherein said metal powder mixture comprises an intermetallic mixture selected from the group consisting of cobalt/titanium, copper/aluminum, iron/aluminum, molybdenum/silicon, niobium/germanium, nickel/aluminum, and titanium/nickel, wherein said metal powder mixture in said first phase has a particle size of 25 micrometers or less; and
a second phase comprising a glass powder, wherein said glass powder is present in an amount of 10% to 90% by volume of the shaped composite,
wherein said metal powder mixture in said first phase is bonded with said glass powder in said second phase,
wherein said shaped composite has a porosity of between 5% and 50%, and
wherein said metal powder mixture and said glass powder are selected so that when the composite is heated to a softening point of said glass powder, an exothermic reaction is initiated within the composite, so that a majority of said glass powder is reduced to its elemental form by said metal powder to form reaction products, and said reaction products react exothermically with other constituents of the shaped composite or with materials in contact with the shaped composite.

17. The shaped composite of claim 16, wherein said intermetallic mixture is selected from the group consisting of cobalt/titanium, copper/aluminum, iron/aluminum, niobium/germanium, nickel/aluminum, and titanium/nickel.

18. The shaped composite of claim 16, wherein said glass powder is present in an amount of 20% to 90% by volume of the shaped composite.

19. A shaped composite, comprising:
a first phase comprising a metal powder mixture, wherein said metal powder mixture comprises a first metal powder selected from the group consisting of molybdenum, tantalum, uranium, tungsten, and any combinations thereof, and a second metal powder selected from the group consisting of magnesium, aluminum, copper, iron, nickel, niobium, molybdenum, silicon, tantalum, titanium, tungsten, vanadium, zirconium, and any combinations thereof;
a second phase comprising a glass powder; and
at least one of a polymeric source of carbon, a polymeric source of fluorine, and an oxidizer,
wherein said metal powder in said first phase is bonded with said glass powder in said second phase,
wherein said glass powder is present in an amount of 10% to 90% by volume of the shaped composite, and
wherein said metal powder and said glass powder are selected so that when the composite is heated to a softening point of said glass powder, an exothermic reaction is initiated within the shaped composite, so that a majority of said glass powder is reduced to its elemental form by said metal powder to form reaction products, and said reaction products react exothermically with other constituents of the shaped composite or with materials in contact with the shaped composite.

20. A shaped composite, comprising:
a first phase comprising a metal powder mixture, wherein said metal powder mixture comprises a first metal powder selected from the group consisting of molybdenum, tantalum, uranium, tungsten, and any combinations thereof, and a second metal powder selected from the group consisting of magnesium, aluminum, copper, iron, nickel, niobium, molybdenum, silicon, tantalum, titanium, tungsten, vanadium, zirconium, and any combinations thereof, wherein said metal powder mixture in said first phase has a particle size of 25 micrometers or less; and
a second phase comprising a glass powder wherein said glass powder is present in an amount of 10% to 90% by volume of the shaped composite,
wherein said metal powder in said first phase is bonded with said glass powder in said second phase,
wherein said shaped composite has a porosity of between 5% and 50%, and
wherein said metal powder is arranged in a spatial arrangement, and said metal powder has a particle morphology, wherein said spatial arrangement and said particle morphology is preserved within the shaped composite, and
wherein said metal powder mixture and said glass powder are selected so that when the composite is heated to a softening point of said glass powder, an exothermic reaction is initiated within the shaped composite, so that a majority of said glass powder is reduced to its elemental form by said metal powder to form reaction products, and said reaction products react exothermically with other constituents of the shaped composite or with materials in contact with the shaped composite.

21. A shaped composite, comprising:
a first phase comprising a mixture of metal powder and metal-oxide powder, wherein said metal powder is selected from the group consisting of magnesium, aluminum, copper, iron, nickel, niobium, molybdenum, silicon, tantalum, titanium, tungsten, vanadium, zirconium, and combinations thereof, wherein said metal-oxide powder is selected from the group consisting of oxides of bismuth, oxides of boron, oxides of copper, oxides of chromium, oxides of manganese, oxides of iron, oxides of molybdenum, oxides of silicon, and any combinations thereof, and wherein said metal powder mixture in said first phase has a particle size of 25 micrometers or less; and
a second phase comprising a glass powder,
wherein said mixture of metal and metal-oxide powders in said first phase is bonded with said glass powder in said second phase, wherein said glass powder is present in an amount of 10% to 90% by volume of the shaped composite, and wherein said mixture of metal powder and metal-oxide powder and said glass powder are selected so that when the composite is heated to a softening point of said glass powder, an exothermic reaction is initiated within the shaped composite, so that a majority of said glass powder is reduced to its elemental form by said metal powder to form reaction products, and said reaction products react exothermically with other constituents of the shaped composite or with materials in contact with the shaped composite.

22. The shaped composite of claim 21, wherein said metal oxide powder comprises an oxide of manganese.

23. The shaped composite of claim 21, wherein said shaped composite has a porosity of between 5% and 50%.

24. The shaped composite of claim 21, wherein said glass powder has a particle size between 75 micrometers and 150 micrometers.

25. A shaped composite, comprising:
a first phase comprising a metal powder mixture, wherein said metal powder comprises a first metal powder selected from the group consisting of molybdenum, tantalum, uranium, tungsten, and any combinations thereof, and a second metal powder selected from the group consisting of magnesium, aluminum, copper, iron, nickel, niobium, molybdenum, silicon, tantalum, titanium, tungsten, vanadium, zirconium, and any combinations thereof; and
a second phase comprising a glass powder, wherein said glass powder comprises a material selected from the group consisting of lanthanum-crown, alumino-phosphate, lead-borate, boro-phosphate, zinc-borate, zinc-phosphate and any combinations thereof,
wherein said metal powder in said first phase is bonded with said glass powder in said second phase,
wherein said glass powder is present in an amount of 10% to 90% by volume of the shaped composite, and
wherein said metal powder mixture and said glass powder are selected so that when the composite is heated to a softening point of said glass powder, an exothermic reaction is initiated within the shaped composite, so that a majority of said glass powder is reduced to its elemental form by said metal powder to form reaction products, and said reaction products react exothermically with other constituents of the shaped composite or with materials in contact with the shaped composite.

26. The shaped composite of claim 25, wherein said metal powder mixture in said first phase has a particle size of 75 micrometers or less.

27. The shaped composite of claim 25, wherein said metal powder mixture in said first phase has a particle size of 25 micrometers or less.

28. The shaped composite of claim 25, wherein said shaped composite has a porosity of between 5% and 50%.

29. A shaped composite, comprising:
a first phase comprising a metal powder mixture, wherein said metal powder mixture comprises a first metal powder selected from the group consisting of molybdenum, tantalum, uranium, tungsten, and any combinations thereof, and a second metal powder selected from the group consisting of cobalt, copper, iron, molybdenum, silicon, niobium, germanium, nickel, magnesium, aluminum, titanium, zirconium, and any combinations thereof,
wherein metal powder mixture in said first phase has a particle size of 25 micrometers or less; and
a second phase comprising a glass powder,
wherein said metal powder mixture in said first phase is bonded with said glass powder in said second phase,
wherein said glass powder is present in an amount of 10% to 90% by volume of the shaped composite,
wherein said shaped composite has a porosity of between 5% and 50%, and
wherein said metal powder mixture and said glass powder are selected so that when the composite is heated to a softening point of said glass powder, an exothermic reaction is initiated within the shaped composite, so that a majority of said glass powder is reduced to its elemental form by said metal powder to form reaction products, and said reaction products react exothermically with other constituents of the shaped composite or with materials in contact with the shaped composite.

30. A shaped composite according to claim 29 where said second metal powder is an intermetallic mixture selected from the group consisting of cobalt/titanium, copper/aluminum, iron/aluminum, molybdenum/silicon, niobium/germanium, nickel/aluminum, and titanium/nickel.

* * * * *